(12) United States Patent
Hunt et al.

(10) Patent No.: US 10,652,704 B2
(45) Date of Patent: *May 12, 2020

(54) BROKER SERVICE APPARATUS FOR CONTROLLING A MOBILE DEVICE

(71) Applicant: International Business Machines Corporation, Armonk, NY (US)

(72) Inventors: Hamish C. Hunt, Ashford (GB); Nicholas K. Lincoln, Hampshire (GB); Christopher J. Poole, Hampshire (GB); Mark A. Woolley, Hants (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,021

(22) Filed: Oct. 31, 2018

(65) Prior Publication Data

US 2019/0069144 A1    Feb. 28, 2019

Related U.S. Application Data

(63) Continuation of application No. 15/516,470, filed as application No. PCT/IB2015/058282 on Oct. 27, 2015, now Pat. No. 10,171,962.

(30) Foreign Application Priority Data

Nov. 21, 2014    (GB) .................................. 1420719.5

(51) Int. Cl.
    *H04W 4/16*    (2009.01)
    *H04W 4/08*    (2009.01)
    (Continued)

(52) U.S. Cl.
    CPC ............... *H04W 4/16* (2013.01); *H04W 4/08* (2013.01); *H04W 76/10* (2018.02); *H04W 8/005* (2013.01); *H04W 88/04* (2013.01)

(58) Field of Classification Search
    CPC ......... H04W 4/08; H04W 4/16; H04W 76/10; H04W 88/04; H04W 8/005; H04W 8/186;
    (Continued)

(56) References Cited

U.S. PATENT DOCUMENTS

| 8,126,017 | B1  | 2/2012  | Zave |
| 8,577,011 | B1* | 11/2013 | Madabhushi ..... H04M 3/42212 |
|           |     |         | 379/211.02 |

(Continued)

FOREIGN PATENT DOCUMENTS

| CN | 101185254 | 5/2008 |
| CN | 102035839 | 4/2011 |

(Continued)

OTHER PUBLICATIONS

JPO Office Action dated Apr. 7, 2019; 1 page.

(Continued)

*Primary Examiner* — Hoang-Chuong Q Vu
(74) *Attorney, Agent, or Firm* — Schmeiser, Olsen & Watts, LLP; William Hartwell (57) ABSTRACT

A method and apparatus for controlling a second mobile device in response to a first mobile device having no connection to a telephony service. In response to receiving a first control signal including the first unique identifier and from the telephony service, the first unique identifier is used to identify the first group. The data is targeted to the first mobile device. In response to the first mobile device not being connected to the broker service apparatus and the second mobile device being connected to the broker service apparatus, a second control signal, which includes the identifier of the first mobile device, is issued to the second mobile device in order to forward the data to the second mobile device.

18 Claims, 10 Drawing Sheets

(51) Int. Cl.
*H04W 76/10* (2018.01)
*H04W 88/04* (2009.01)
*H04W 8/00* (2009.01)

(58) Field of Classification Search
CPC ........... H04M 15/53; H04M 1/006; H04M 2203/2094; H04L 25/20; H04L 65/1096
See application file for complete search history.

(56) References Cited

U.S. PATENT DOCUMENTS

| | | | |
|---|---|---|---|
| 9,058,586 B2 | 6/2015 | Chakra et al. | |
| 9,723,461 B2 | 8/2017 | Govande et al. | |
| 2002/0080751 A1* | 6/2002 | Hartmaier | H04Q 3/0029 370/338 |
| 2002/0137498 A1 | 9/2002 | Goss et al. | |
| 2004/0254809 A1 | 12/2004 | Teicher | |
| 2005/0238148 A1* | 10/2005 | Poustchi | H04M 1/006 379/88.17 |
| 2007/0008891 A1* | 1/2007 | Kline | H04L 12/2803 370/238 |
| 2007/0025539 A1 | 2/2007 | Claudatos et al. | |
| 2008/0032689 A1 | 2/2008 | Kubota et al. | |
| 2009/0005024 A1 | 1/2009 | Kato | |
| 2009/0298459 A1 | 12/2009 | Saini et al. | |
| 2011/0081007 A1* | 4/2011 | Bar-Yoav | H04L 51/24 379/88.13 |
| 2012/0134363 A1* | 5/2012 | Little | H04L 67/16 370/400 |
| 2013/0143529 A1 | 6/2013 | Leppanen | |
| 2014/0045473 A1 | 2/2014 | Salisbury et al. | |
| 2014/0065997 A1 | 3/2014 | Walker et al. | |
| 2014/0112242 A1 | 4/2014 | Vilmur et al. | |
| 2014/0171048 A1 | 6/2014 | Sanaullah et al. | |
| 2015/0016447 A1 | 1/2015 | Cohen et al. | |
| 2015/0172104 A1* | 6/2015 | Brandwine | H04L 69/40 709/224 |
| 2015/0223030 A1 | 8/2015 | Gu et al. | |
| 2015/0358476 A1 | 12/2015 | Flores-Estrada | |
| 2016/0006866 A1* | 1/2016 | Fogel | H04L 65/00 455/414.1 |
| 2016/0183065 A1 | 6/2016 | Du et al. | |
| 2018/0234817 A1 | 8/2018 | Hunt et al. | |

FOREIGN PATENT DOCUMENTS

| | | |
|---|---|---|
| CN | 102984679 | 3/2013 |
| EP | 1246489 | 10/2002 |
| JP | 2015115753 | 6/2015 |

OTHER PUBLICATIONS

Power Out? We have your back, 2 pages, Retrieved from Internet: https://callringtalk.com/emergency-call-forwarding/ (website).

Klozin, Smart Call Forwarding Lite, May 8, 2014, Retrieved from Internet: https://play.google.com/store/apps/details?id=klozin. SmartCallForwardingLite, (phone App) 1 page.

Notice of Allowance (dated Sep. 13, 2018) U.S. Appl. No. 15/516,470, filed Apr. 3, 2017.

CN Office Action dated Aug. 27, 2019; 2 pages.

* cited by examiner

BROKER SERVICE APPARATUS FOR CONTROLLING A MOBILE DEVICE

This application is a continuation application claiming priority to Ser. No. 15/516,470, filed Apr. 3, 2017, now U.S. Pat. No. 10,171,962 issued Jan. 1, 2019.

FIELD OF THE INVENTION

The present invention relates to a broker service apparatus for controlling a second mobile device.

BACKGROUND

A known limitation with mobile devices is that a user is only able to use a mobile device to send and/or receive data such as a call when the user is connected to a telephony service by e.g., being located in a serviceable region of an associated service provider or connected to a telephony service such as Voice over IP (VOIP). Connectivity can be further limited by e.g., reception capability of the mobile device itself.

It is currently known for a user to be able to manually configure a call forwarding service to a nominated, separate mobile device if the user's mobile device is not able to receive calls and/or data. Known applications can also be used to configure call forwarding based on a set of rules that a user specifies.

For example, EP 1246489 discloses a method for providing automatic call-forwarding service for a mobile unit. If the mobile unit is out of service, calls intended for the mobile unit are automatically forwarded to another phone. This call forwarding occurs automatically without requiring user interaction. Upon detection of the mobile unit coming into service, such as when the mobile unit powers on or enters the service area of a wireless service provider, the automatic call forwarding ceases, and the mobile unit receives its own incoming calls.

However, these known solutions require manual configuration which can be complicated and creates a process overhead. Further, such solutions are not scalable in that a call can only be forwarded to a single, nominated device. Additionally, a forwarded call is transmitted to a nominated device such as another mobile device or a landline telephone which are separate devices from a user's—this causes extra process overhead for a user to retrieve a call.

SUMMARY

An embodiment of the present invention provides a broker service apparatus for controlling a second mobile device in response to a first mobile device having no connection to a telephony service, wherein the first mobile device is operable to transmit an identifier to the second mobile device using a network connection that is operable to connect mobile devices and wherein the first mobile device and the second mobile device are operable to join a first group; wherein the broker service apparatus is configured to: assign a unique identifier to a group; notify the telephony service of the unique identifier; responsive to receipt of a first control signal comprising a first unique identifier and data from a telephony service, wherein the data is targeted to the first mobile device, use the first unique identifier to identify the first group; responsive to the first mobile device not being connected to the broker service, determine whether the second mobile device is connected to the broker service; responsive to the second mobile device being connected to the broker service, issue a second control signal to the second mobile device in order to forward the data to the second mobile device, the second control signal comprising the identifier of the first mobile device; wherein the second control signal is operable to cause the second mobile device to use the identifier of the first mobile device and the network connection in order to forward the data to the first mobile device.

An embodiment of the present invention provides a method for controlling a second mobile device in response to a first mobile device having no connection to a telephony service, wherein the first mobile device is operable to transmit an identifier to the second mobile device using a network connection that is operable to connect mobile devices and wherein the first mobile device and the second mobile device are operable to join a first group; wherein the method comprises the steps of: by a broker service: assigning a unique identifier to a group; notifying the telephony service of the unique identifier using, in response to receiving a first control signal comprising a first unique identifier and data from a telephony service, wherein the data is targeted to the first mobile device, the first unique identifier to identify the first group; determining, in response to the first mobile device not being connected to the broker service, whether the second mobile device is connected to the broker service; issuing, in response to the second mobile device being connected to the broker service, a second control signal to the second mobile device in order to forward the data to the second mobile device, the second control signal comprising the identifier of the first mobile device; wherein the second control signal causes the second mobile device to use the identifier of the first mobile device and the network connection in order to forward the data to the first mobile device.

An embodiment of the present invention provides a computer program comprising computer program code stored on a computer readable medium to, when loaded into a computer system and executed thereon, cause said computer system to perform all the steps of the method described above.

BRIEF DESCRIPTION OF THE DRAWINGS

The subject matter regarded as the present invention is particularly pointed out and distinctly claimed in the concluding portion of the specification. The present invention, both as to organization and method of operation, together with features and advantages thereof, may best be understood by reference to the following detailed description when read with the accompanying drawings.

Embodiments of the present invention will now be described, by way of example only, with reference to the following drawings.

DETAILED DESCRIPTION

Figure 1:
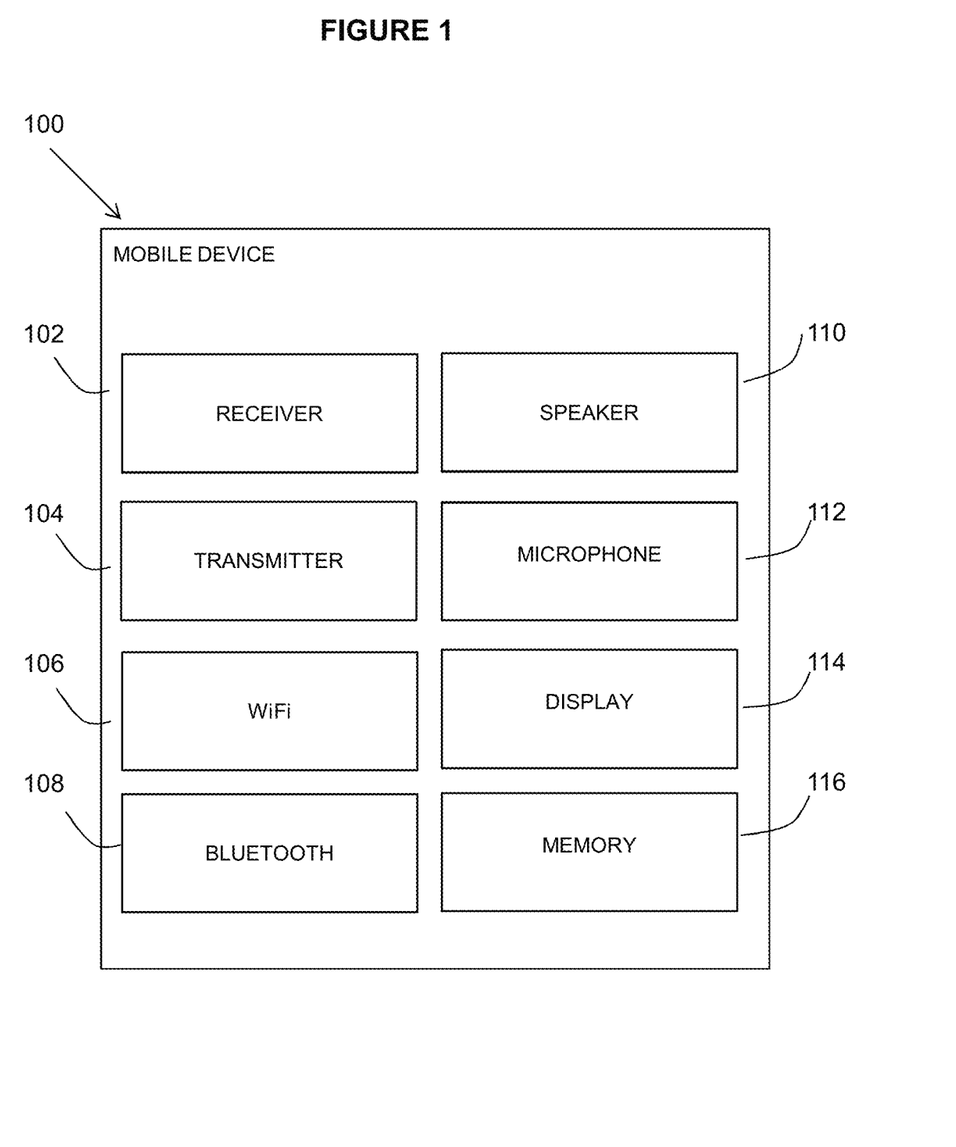
FIG. 1 is a block diagram of a mobile device as utilized in an embodiment of the present invention.

With reference to FIG. 1, there is shown a mobile device (100) for use with an embodiment comprising a receiver (102) for receiving data; a transmitter (104) for transmitting data; one or more wireless network connections, such as Wi-Fi (106) and Bluetooth (108); a speaker (110); a microphone (112); a display (114) and memory (116). The mobile devices may be operable to access telephony services e.g., using a service provider; a VOIP system etc.

Figure 2:
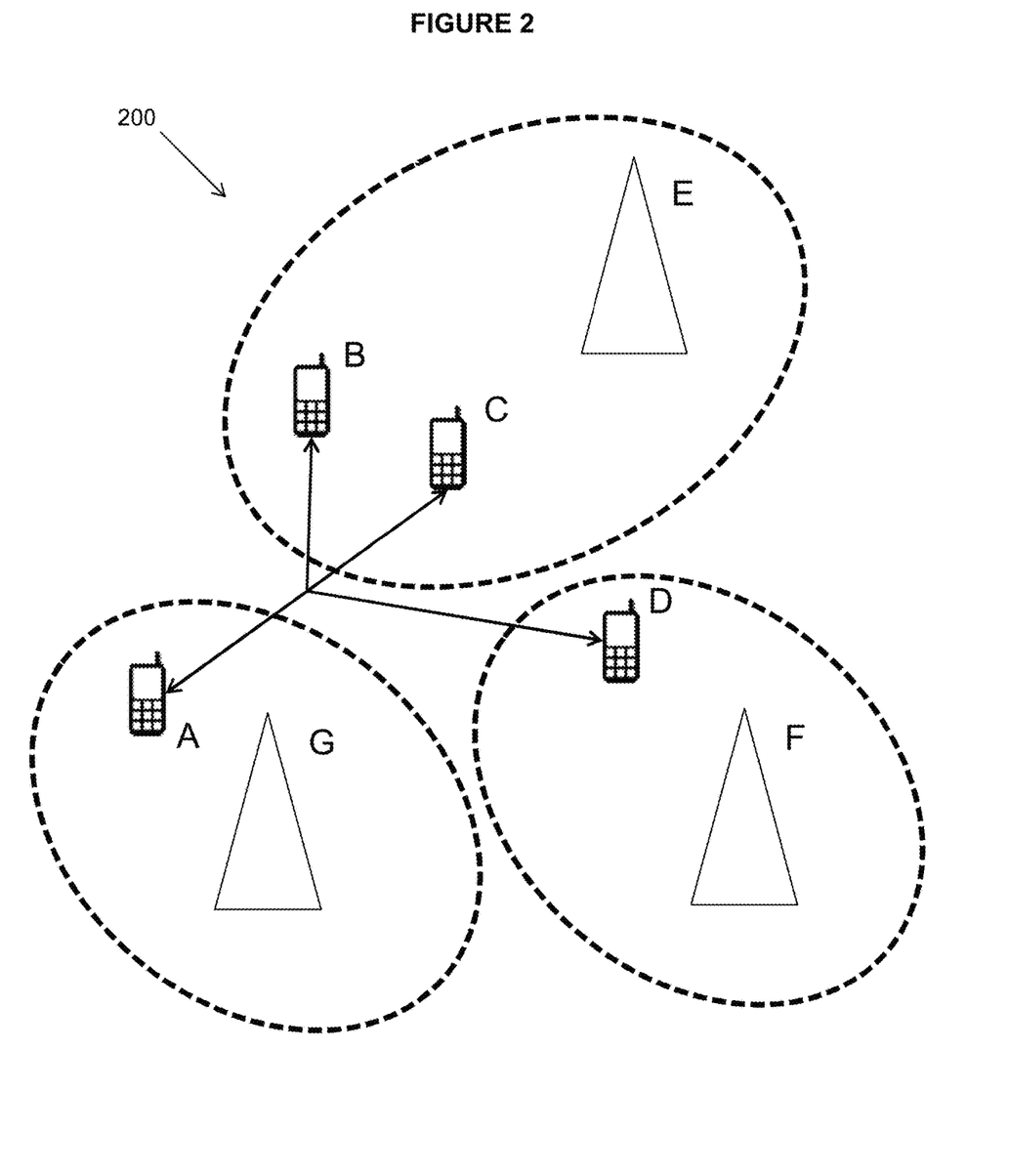
FIG. 2 is a block diagram of a system comprising a number of mobile devices and associated service providers.

With reference to FIG. 2, there is depicted a system (200) in which an embodiment may be implemented, wherein a plurality of users have a plurality of mobile devices which may be registered with differing telephony services e.g., service providers (e.g., mobile device A is registered with service provider G; mobile devices B and C are registered with service provider E and mobile device D is registered with service provider F).

If a mobile device is able to establish a network connection with the mobile device's service provider's network, the mobile device is operable to send and/or receive calls and/or data. Equally, if a mobile device is able to establish a network connection to a telephony service such as a VOIP system, the mobile device is operable to send and/or receive calls and/or data.

However, if a mobile device is not able to establish a network connection to a telephony service e.g., if the mobile device is disconnected from its service provider's network, data cannot be exchanged between the mobile device and the service provider. For example, with reference to FIG. 3, mobile devices B and C are able to establish a connection to the network of service provider E and mobile device D is able to establish a connection to the network of service provider F. However, mobile device A is not able to establish a connection to the network of service provider G. Currently, known solutions such as call forwarding can be used, however, this mechanism has drawbacks which have been stated above in the background section.

According an embodiment, a mobile device that is not able to connect with a telephony service; e.g., its service provider's network, is still able to send and/or receive calls and/or data as will be described herein.

Figure 4:
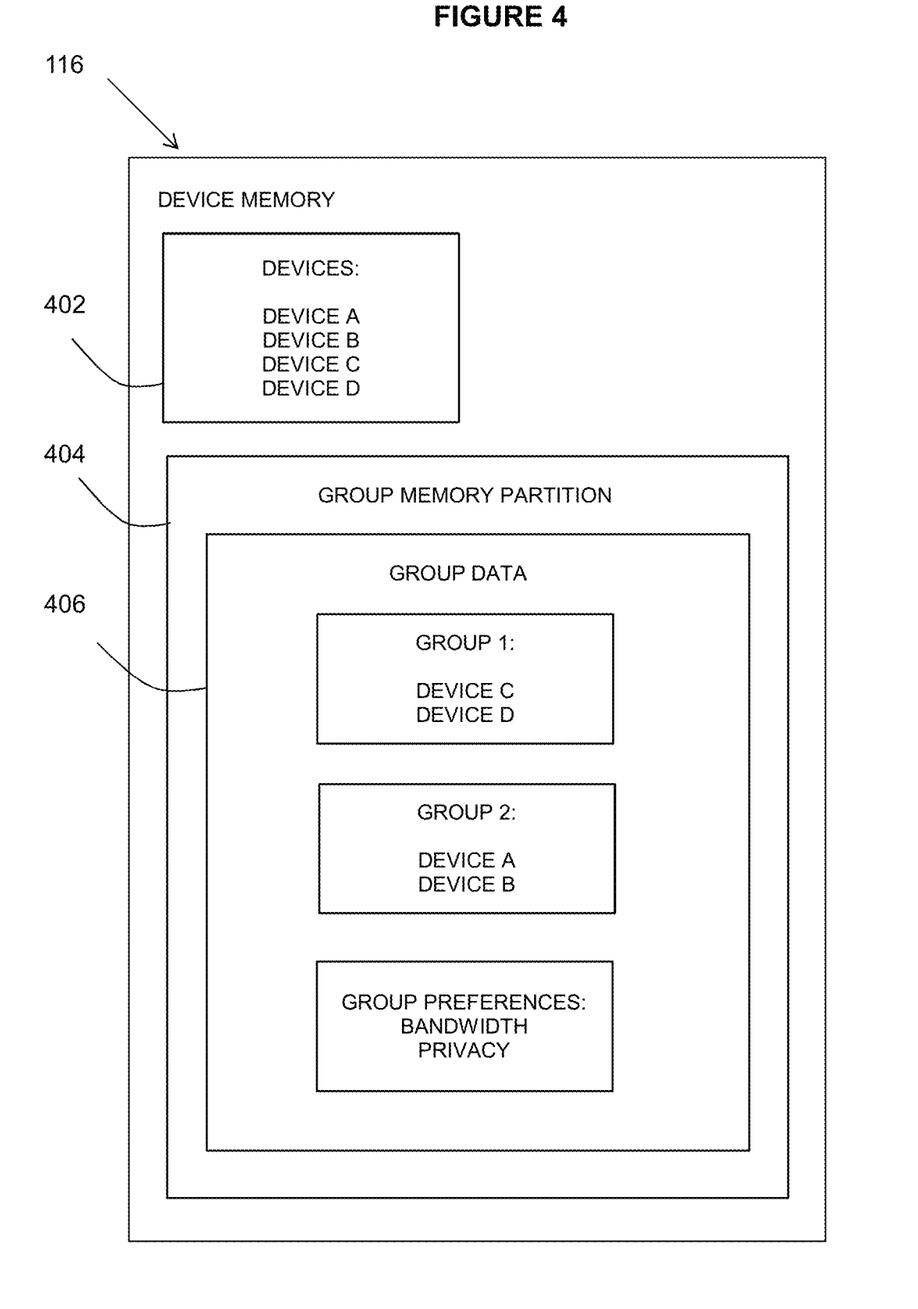
FIG. 4 is a block diagram of mobile device memory according to an embodiment of the present invention.

In an embodiment, a mobile device is operable to identify itself to another mobile device by using the transmitter (104) to transmit data comprising an identifier e.g., using a wireless network connection, such as Wi-Fi (106) and Bluetooth (108). A plurality of mobile devices identified to each other is operable to form a group of mobile devices as will be described in further detail herein. If a mobile device loses connection with e.g., its service provider is conceivable that the mobile device may still retain connectivity (using a network connection such as Bluetooth that is operable to connect devices e.g., mobile devices) with at least a subset of the other plurality of mobile devices in its group. According to an embodiment, memory (116) associated with each mobile device is configured as depicted in FIG. 4. The memory (116) is operable to store a record (402) of identifiers of mobile devices.

In an embodiment, two or more of the mobile devices can be included in a group of mobile devices and as such, the memory (116) also comprises a memory partition (404) associated with a group of mobile devices for storing group data (406) comprising: a group identifier which is operable to be made private or public (e.g., Group 1, Group 2) and associated mobile device identifiers (e.g., Device A; Device B; Device C; Device D) of two or more mobile devices; and one or more group preferences (e.g., Bandwidth, Privacy). Note that a mobile device may store data associated with a plurality of groups of mobile devices.

In an embodiment, the record (402) and the group memory partition (404) are configured in a pre-processing step.

In an embodiment, each of the mobile devices is operable to give permission to enable data transfer to/from another mobile device in a group by enabling an internal flag. In this way, mobile devices within a group enable data transfer to/from each other.

In an embodiment, data associated with data transfer between the mobile devices is stored in the group memory partition (404).

In an embodiment, upon successful configuration of a group of mobile devices (as will be described in more detail herein), each mobile device included in the group is able to connect to at least one other mobile device included in the group using e.g., a wireless network connection such as Wi-Fi or Bluetooth (alternatively, a physical connection such as a cable can be used). If a wireless network connection to one or more of the other mobile devices cannot be made, known path configuration algorithms (e.g., round robin; priority-based) are used in order to attempt to establish a wireless connection with an available mobile device.

In an embodiment, any notification that is sent to a mobile device in the group is operable to be queued, such that a mobile device that is not currently available, is notified as soon as such mobile device becomes available e.g., using an SMS message; a push notification; publishing a message on a topic, etc.

A set of operations are provided by an embodiment as described below.

A mobile device is operable to join a group of mobile devices. In an embodiment, the group comprises a set of "trusted" mobile devices which are associated in some way, for example, wherein the mobile devices belong to users known to each other; wherein the mobile devices have had past interactions etc.

In one example, a mobile device can request to join a group; e.g., by sending the request to a mobile device included in the group. The mobile device is operable to authorize the request and in response, the mobile device is operable to send a notification of the authorization to each of the other mobile devices in the group and send associated group data to the requesting mobile device. In another example, a mobile device can be nominated (e.g., by another mobile device sending a request to the nominated mobile device) to be included in a group of mobile devices. The nominated mobile device is operable to authorize the request and in response, the requesting mobile device is operable to send a notification of the authorization to each of the other mobile devices in the group and send associated group data to the nominated mobile device. If any of the other mobile devices do not already store a mobile device identifier of the nominated mobile device in their record (402), the other mobile devices are prompted to do so by the requesting mobile device. In yet another example, a mobile device can be configured to automatically join a group e.g., for which an included mobile device is proximate e.g., by enabling a flag associated with a group or a mobile device.

A mobile device may depart a group at any time; e.g., by sending the request to a mobile device included in the group. In an embodiment, a mobile device in the group is operable to authorize the request. Alternatively, a mobile device can depart a group without the authorization of a mobile device. In response to a mobile device departing a group, a mobile device (e.g., the departing mobile device) in the group is operable to send a notification of the departure to each of the other mobile devices in the group and, each of the mobile devices in the group may be operable to update its memory (116) to reflect the departure e.g., by removing an identifier of the departing mobile device from the associated group data.

In an embodiment, one or more group preferences such as a maximum permissible shared bandwidth is made available to mobile devices included in a group and can be set (e.g., by a mobile device) by default; priority etc. In an embodiment, a numeric value associated with the maximum bandwidth is stored in the group preferences (406).

In an embodiment, a mobile device can set one or more flags to specify permitted routing data types and directions. For example, a data type can comprise "call and data", "calls only" or "data only" and a direction can comprise "inbound and outbound", "inbound only", or "outbound only".

In an embodiment, management settings associated with groups are provided for each mobile device such that e.g., one or more users can decide which group's data should be kept; deleted etc.

In an embodiment, privacy preferences are associated with the group identifiers e.g., such group identifiers (and associated mobile device identifiers) can be set to private or public by use of a flag.

In an embodiment, the above operations are associated with establishment and subsequent use of a group. Once a group is established, a user may interact with the user's mobile device as usual, without the need to perform any additional actions.

According to an embodiment, a mobile device can connect (e.g., using a connection such as Wi-Fi, Bluetooth, GPRS etc.) to a broker service. The broker service, which can be implemented by a broker service computer apparatus such as the data processing system 900 in FIG. 9, can be remotely located to the group of mobile devices, either separately from a service provider or integrated with the service provider. Alternatively, the broker service can reside locally on one or more of the mobile devices.

Figure 5:
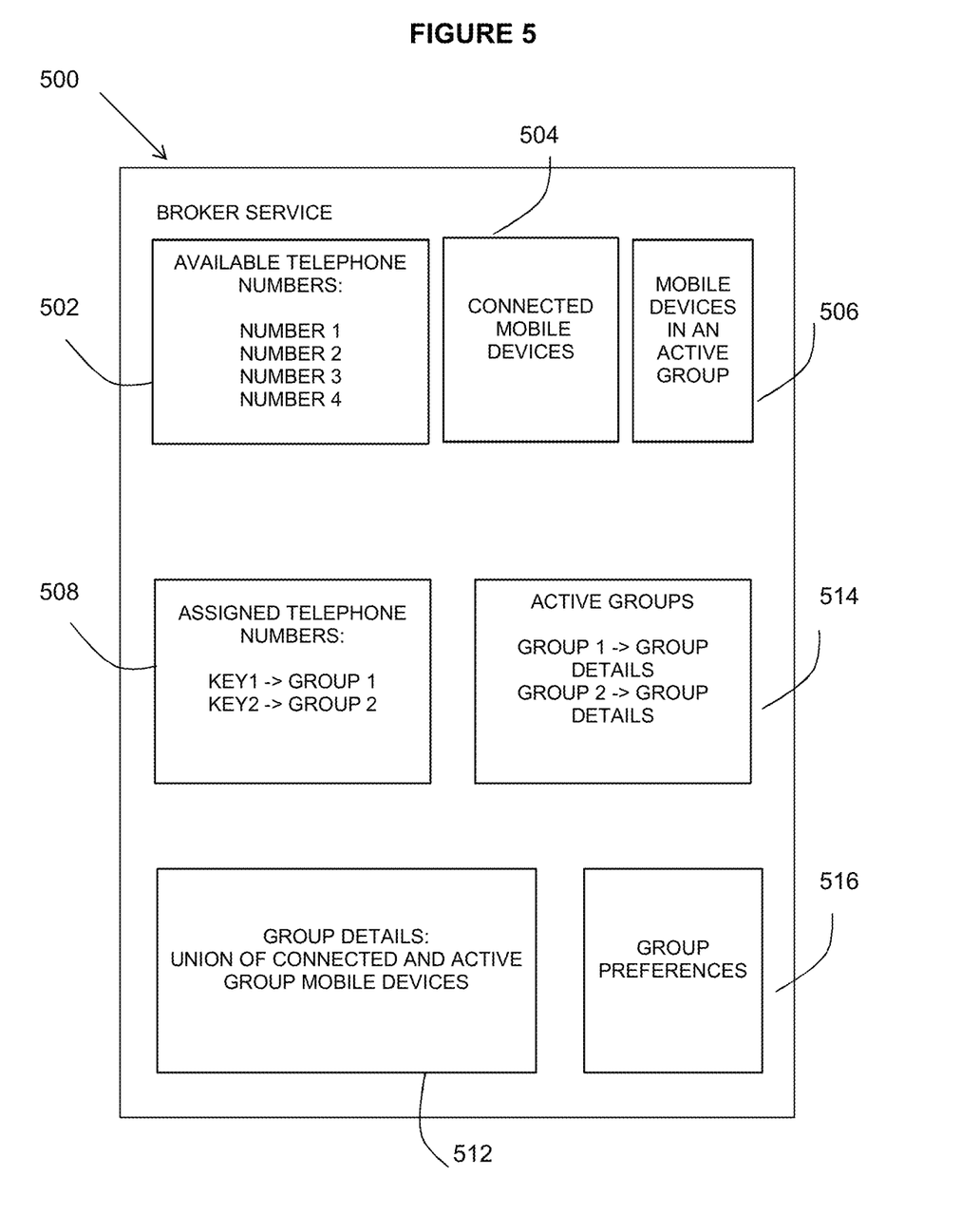
FIG. 5 is a block diagram of a broker service according to an embodiment of the present invention.

A broker service (500) is shown in FIG. 5 and comprises a list (502) of available telephone numbers (502) on which incoming calls can be accepted; a list (504) of mobile devices connected to the broker service (500); a list (506) of mobile devices in one or more active groups (that is, a group that has been activated as will be described below); a list (508) of assigned telephone numbers; a list (514) of active groups and associated lists (512 and 516) of group details and group preferences, respectively.

It is assumed that mobile devices in an active group are connected to each other using e.g., a wireless network connection such as Wi-Fi or Bluetooth or as a minimal requirement, that a connection is formed between a disconnected mobile device and one other mobile device in the group.

In an embodiment, a broker service (500) is able to accept a connection from a mobile device, for example, wherein the connection is a wireless data connection such as Wi-Fi or GPRS. Once the connection is accepted, the broker service (500) adds an identifier associated with the mobile device to the list (504) of mobile devices. Further, if a connection between a mobile device and the broker service (500) is broken, the broker service (500) removes an identifier associated with the mobile device to the list (504) of mobile devices.

In an embodiment, each mobile device in the group which has a connection to the broker service (500) periodically broadcasts a notification to each of the other mobile devices in the group informing the other mobile devices of the connection wherein each mobile device in the group is operable to store the notification in the mobile device's memory store (116).

Activation of a group will now be described.

In an embodiment, any (e.g., using a first to activate rule; round robin rule etc.) mobile device associated with the group is operable to activate the group by making a request to the broker service (500). However, at least one mobile device in the group is required to be connected to the broker service (500) in order for an activation function to be enabled. If a mobile device which activates a group has a connection to the broker service (500), a function to enable activation is disabled (e.g., by the mobile device which activates the group or by any mobile device associated with the group) for each of the remaining mobile devices in the group, because activation need only occur once. If a mobile device which activates a group does not have a connection to the broker service (500), the mobile device passes a request (e.g., using a Bluetooth data channel) for activation to another mobile device in the group which has a connection to the broker service (500) and the another mobile device forwards the request to the broker service (500) (e.g., using a WiFi channel). Another mobile device can be found by inspecting the disconnected mobile device's memory (116); in a priority order; using a round robin technique (wherein mobile devices form a chain as follows, with the arrow representing a pointer to the proceeding mobile device in the chain to which the request should be passed: A→B→C→D→A) etc.

Figure 6:
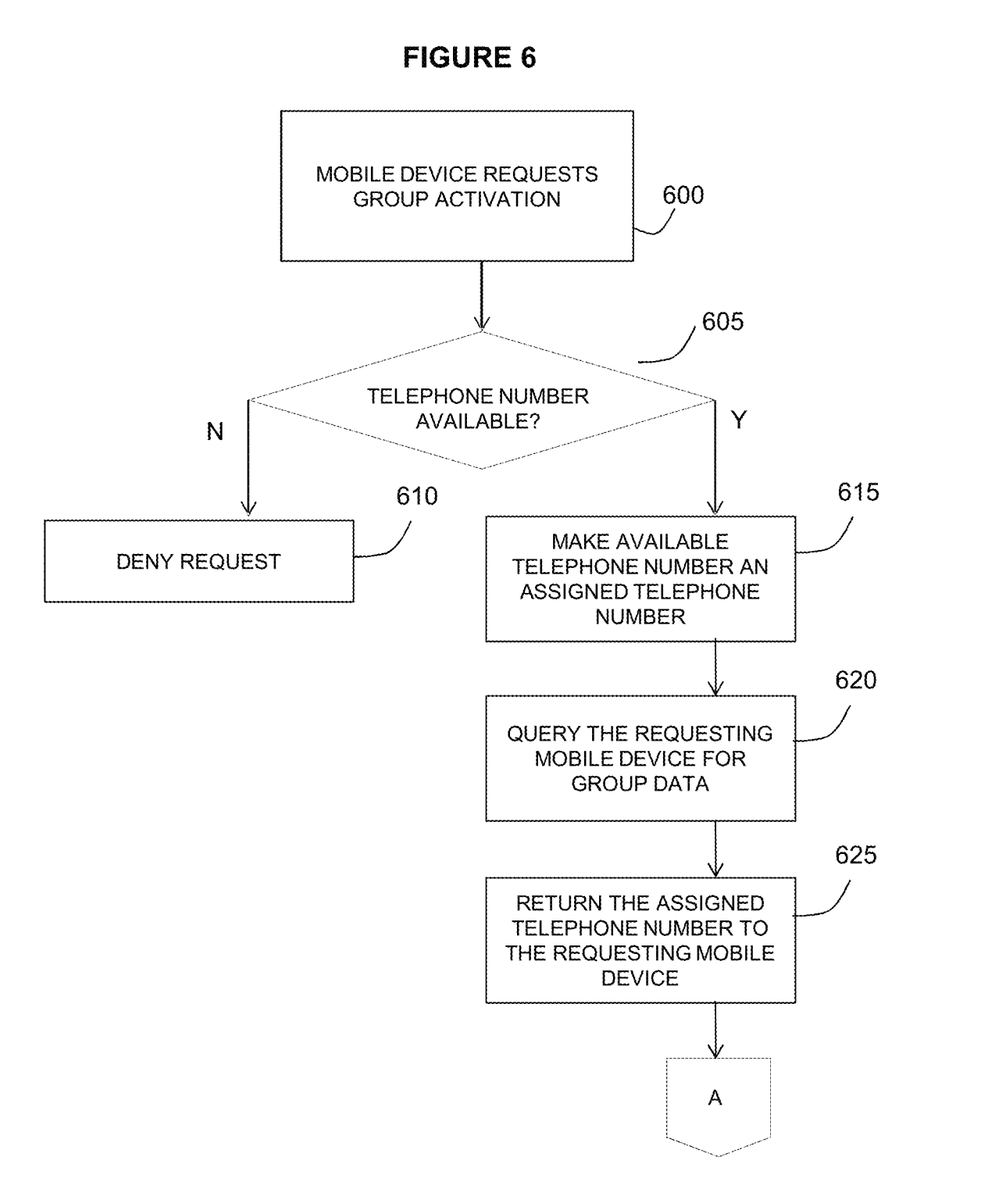
FIG. 6 is a flow chart showing the operational steps involved in a process of establishing a group of mobile devices according to an embodiment of the present invention.

With reference to FIG. 6, in response to a mobile device making (step 600) a request to the broker service (500) to activate a group, the broker service (500) queries (step 605) its list (502) of available telephone numbers. If a telephone number is not available, in one implementation, the function to activate a group is unsuccessful and the request is denied (step 610). In another implementation, the request is queued (e.g., until a telephone number becomes available).

If a telephone number is available, the broker service (500) reserves an available telephone number; removes the available telephone number from the list (502) of available telephone numbers; and moves (step 615) the available telephone number to the list (508) of assigned telephone numbers. An assigned telephone number is associated with the broker service (500) which passes the information to a service provider (e.g., by storing the assigned telephone number in a subscriber record associated with a service provider). The remote broker service can uses the assigned telephone number as a unique key to a group of mobile devices.

Note that a mobile device can request to deactivate a group resulting in the broker service (500) removing the group from the list (514) of active groups and releasing the assigned telephone number associated with the group from the list (508) of assigned telephone numbers such that the telephone number is made available to be used by another group if required.

The broker service (500) queries (step 620) the requesting mobile device for group data (400) associated with the group that is requested to be activated. Once received, the broker service (500) uses the group data (400) to populate lists 514 and 516.

At step 625, the assigned telephone number is returned to the requesting mobile device which distributes (step 630) the assigned telephone number to each of the other mobile devices associated with the group.

Each mobile device associated with the group configures (step 635) its automated call forwarding number and telephone number upon divert to be the assigned telephone number by inputting the assigned telephone number into an associated subscriber record. Alternatively, each mobile device in the group can have a unique telephone number assigned by the broker service (500). However, the alternative embodiment requires significantly more telephone numbers to be made available to the broker service (500).

In an embodiment, the broker service (500) monitors (step 640) and updates data associated with the group as will be described herein. Each identifier associated with mobile devices in the group is added to the list (506) of mobile devices in an active group. Note that the broker service (500), stores data associated with one or more mobile devices that have a connection to the broker service (500) and one or more mobile devices that are within an active group using lists 504 and 514. It is the union of these data sets (i.e., lists 504 and 514) that represents mobile devices that have a connection to the broker service (500) and are within an active group as reflected in list 512. In an embodiment, the broker service (500) monitors the union such that when a mobile device drops the mobile device's connection to the broker service (500), the broker service (500) updates the list (512) of group details. In an embodiment, if each mobile device in a group drops its connection to the broker service (500), the broker service (500) waits for a pre-configurable time before invoking any action because it may be the case that each of the mobile devices has temporarily lost connection to their respective service providers.

Figure 7:
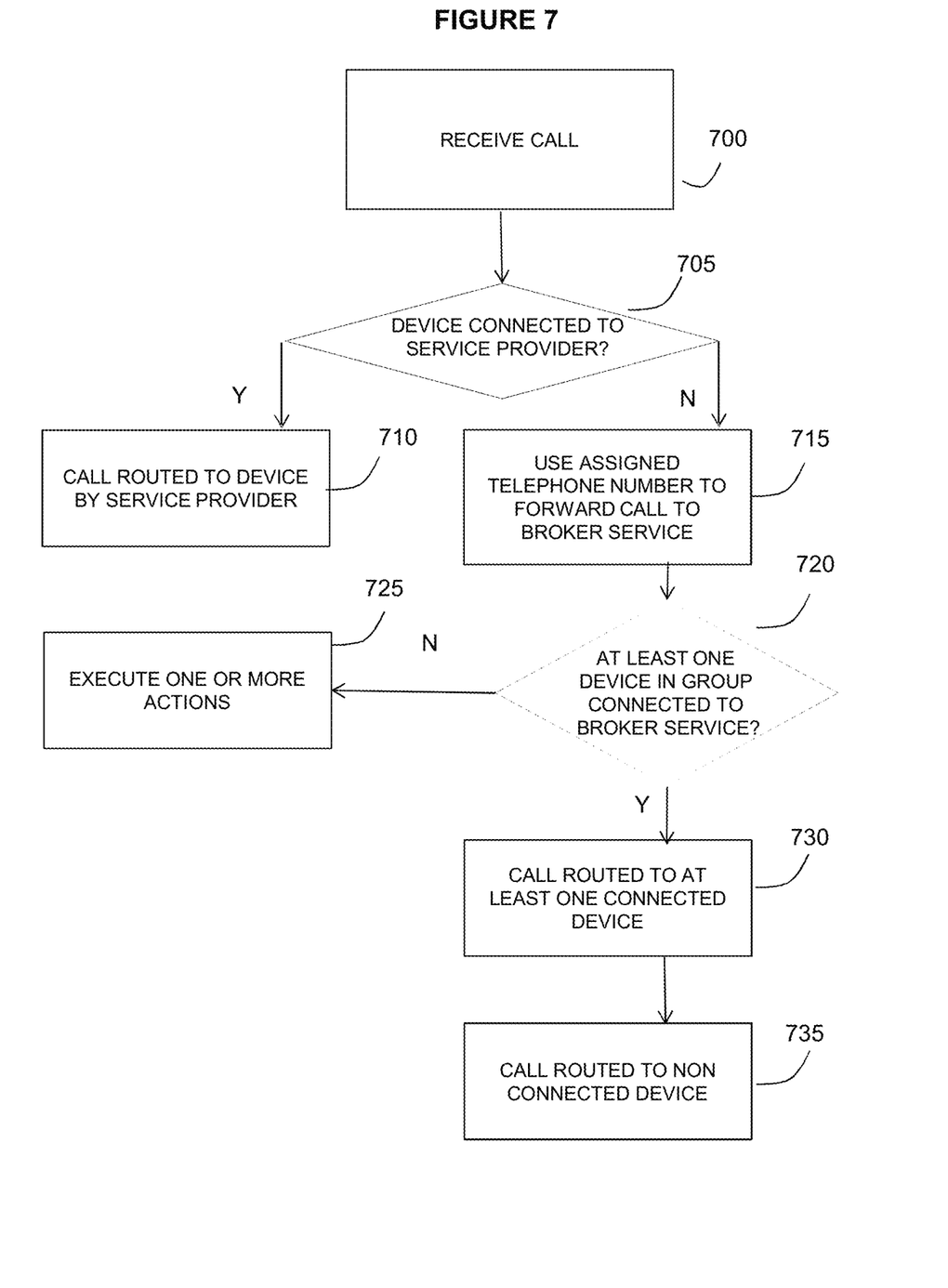
FIG. 7 is a flow chart showing the operational steps involved in a process of making a call according to an embodiment of the present invention.

A flow chart showing the operational steps involved in process for receiving a telephone call at a mobile device which does not have a connection to a telephony service e.g., its service provider will now be described with reference to FIG. 7. Equally, a mobile device may not be able to establish e.g., an Internet connection with a telephony service such as a VOIP system.

Figure 3:
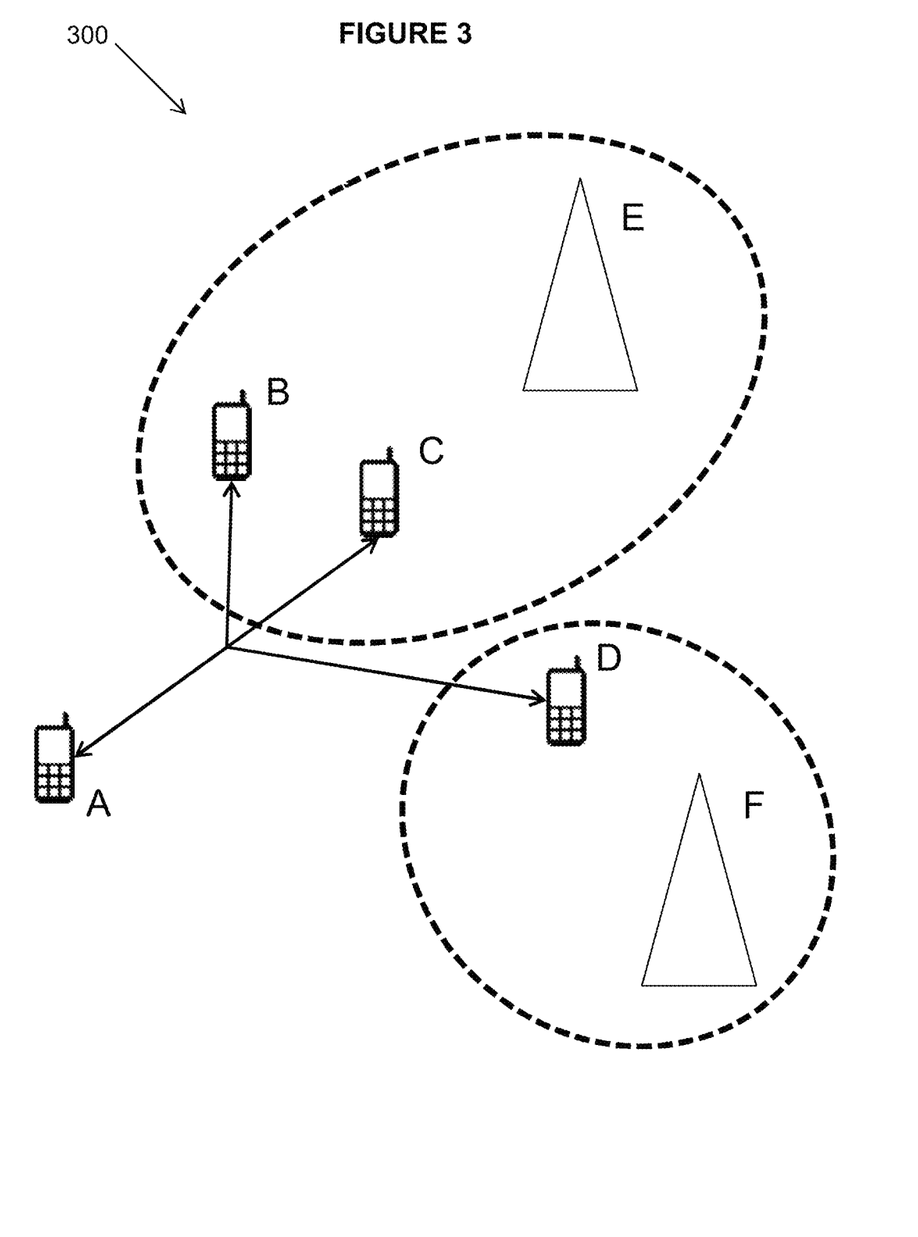
FIG. 3 is a block diagram of the system of FIG. 2 depicting a mobile device disconnected from it service provider.

At step 700, a service provider receives a call from an external party (using e.g., a computer; a landline telephone; a mobile telephone etc.) for mobile device A in FIG. 3, comprising data associated with the external party (e.g., a telephone number of an associated mobile device). The call further comprises an identifier associated with mobile device A.

At step 705, if mobile device A is connected to a telephony service e.g., to service provider G—which is detectable using a subscriber record for mobile device A that is held by service provider G, the telephone call is routed (step 710) to mobile device A e.g., by service provider G.

At step 705, if mobile device A is not connected to service provider G, service provider G uses the identifier associated with mobile device A to query a subscriber record associated with mobile device A for an assigned telephone number that is stored by a mobile device as described at step 635.

At step 715, service provider G includes the assigned telephone number in a first control signal that service provider G issues to the broker service (500) in order to forward the call to the broker service (500) e.g., using GSM, 3G or LTE or any number of other protocols.

At step 720, in response to receiving the call, the broker service (500) uses the assigned telephone number as a key to the list (508) of assigned telephone numbers in order to identify which group is associated with the assigned telephone number. In response to determining the group, the broker service (500) checks the list (512) of mobile devices that have a connection to the broker service (500) and that are within the group in order to determine whether there is at least one mobile device in the group that is connected to the broker service (500).

If at least one mobile device in the group is not connected to the broker service (500), at least one of service provider G and the broker service (500) execute (step 725) one or more actions e.g., service provider G can attempt to forward the call to a voicemail service of mobile device A; if service provider G is not able to forward the call to a voicemail service of mobile device A, service provider G can issue a denial of service notification (e.g., a beeping tone) to the external party, postpone transmission of the call etc.

If at least one mobile device in the group is connected to the broker service (500), the broker service (500) executes one or more actions to identify the mobile device in the group to which the call is directed to. The identification can occur in a number of ways: for example, service provider G may include the identifier associated with mobile device A in the first control signal. Alternatively, if each mobile device in the group has a unique assigned telephone number, the broker service (500) performs a lookup of the unique assigned telephone number associated with the received call in order to identify an associated mobile device. However, in the example herein, the received call comprises an assigned telephone number that is shared amongst each of the mobile devices in the group. In such an example and e.g., if service provider G has not provided the identifier associate with mobile device A, the broker service (500) checks the list (512) of mobile devices that have a connection to the broker service (500) against the mobile devices in the group in accordance with list 506—if only one mobile device in the group is not connected to the broker service (500), the broker service (500) determines that the disconnected mobile device is the mobile device to which the call should be directed. Alternatively, if a call by the external party is placed using e.g., VOIP, an associated Session Initiation Protocol (SIP) is used for communication by which a mobile device can identify or not identify its telephone number for inclusion in a SIP header. If a mobile device that is the target of the call identifies its telephone number for inclusion in a SIP header, the broker service (500) queries the SIP header in order to determine which mobile device the call should be directed to.

In response to determining the mobile device to which the call should be directed (in this example, mobile device A), if only one mobile device in the group is connected to the broker service (500), the broker service (500) uses the assigned telephone number to issue a second control signal to the connected mobile device in order to forward (step 730) the call to the connected mobile device, for example, by routing associated VOIP data packets over the Internet e.g., the data packets comprising an identifier of the mobile device to which the call should be directed. The connected mobile device responsively issues a third control signal to the mobile device e.g., mobile device A which does not have a connection to a telephony service in order to forward (step 735) the call to the receiver (102) of mobile device A. The connected mobile device routes associated data packets using a network connection that is operable to connect mobile devices e.g., Bluetooth, Wi-Fi etc. Advantageously, the mobile device which does not have a connection to a telephony service is still operable to receive calls and/or data if it is able to connect to the connected mobile device using a network connection that is operable to connect mobile devices.

If more than one mobile device in the group is connected to the broker service (500), the broker service (500) may select an optimal path between the connected mobile devices and the disconnected mobile device. For example, a path containing the fewest mobile devices can be selected which advantageously, minimizes the amount of data transfer required between mobile devices in a group. In another example, selection of a path can occur by using load balancing techniques and/or user preferences—e.g., if multiple optimal paths are determined, an optimal path having the most available bandwidth is selected. Multiple, optimal paths are beneficial, since the paths represent alternative paths that can be selected should the service provision of an existing path be removed. In an embodiment, the alternative path can be switched such that there is no apparent loss in service to the user. Such automatic switching mechanisms are known in the art, for example, the use of wireless mesh networks.

Following step 735, a number of actions can be executed e.g., the owner of the disconnected mobile device (e.g., mobile device A) may answer the call; the broker service (500) may issue a denial of service notification to the external party if the call is not successfully transferred to mobile device A.

Figure 8:
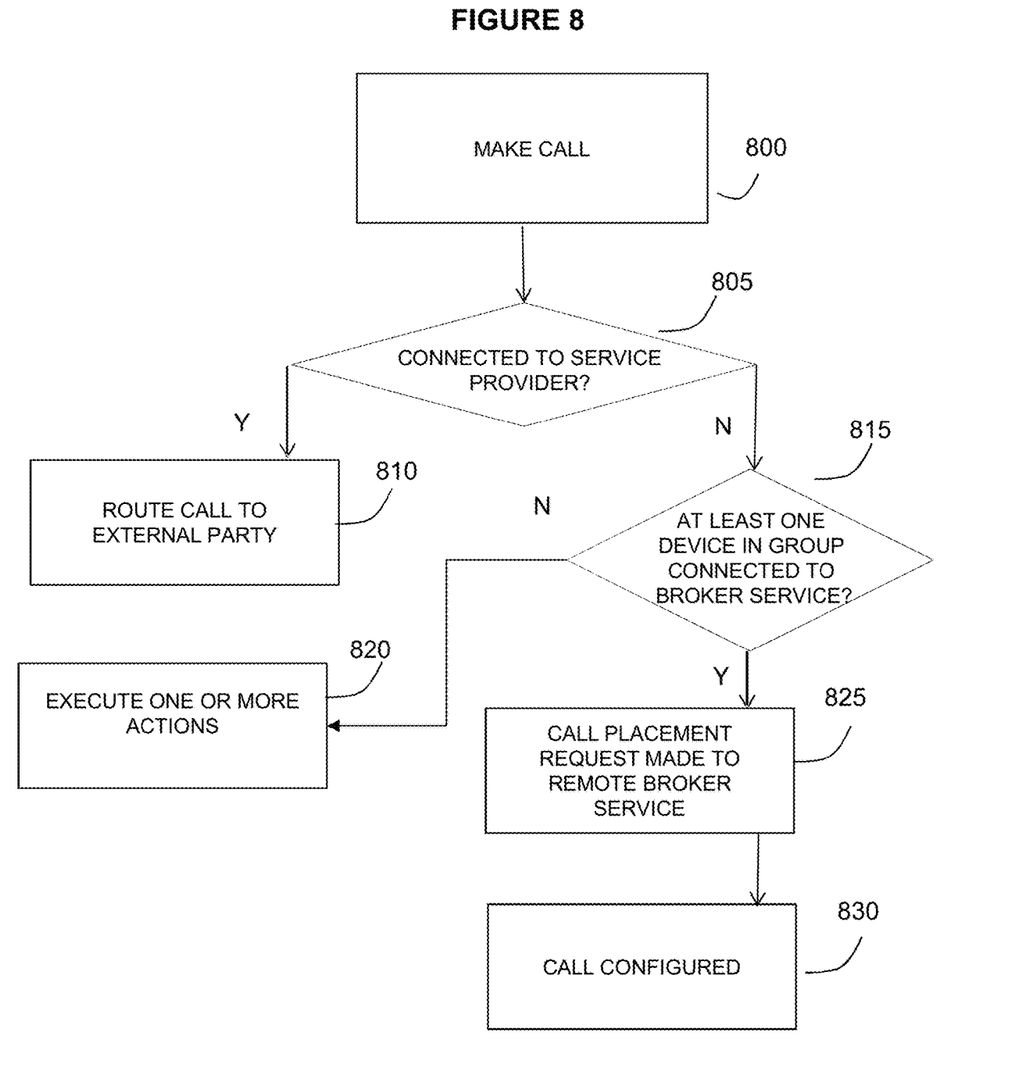
FIG. 8 is a flow chart showing the operational steps involved in a process of receiving a call according to an embodiment of the present invention.

A flow chart showing the operational steps involved in process for making a telephone call from a mobile device which does not have a connection to its own service provider or the Internet will now be described with reference to FIG. 8.

At step 800, mobile device A attempts to make a call to an external party (having e.g., a computer; a landline telephone; a mobile telephone etc.).

At step 805, if mobile device A is connected to service provider G and/or the Internet, the telephone call is routed (step 810) the telephone call to the external party e.g., by service provider G or using VOIP.

At step 805, if mobile device A is not connected to service provider G, mobile device A checks (step 815) its store to determine whether any of the mobile devices in the group have a connection to a broker service (500).

If at least one mobile device in the group is not connected to a broker service (500), mobile device A executes one or more actions e.g., mobile device A waits for a pre-configurable period of time before retrying step 800.

If at least one mobile device in the group is connected to a broker service (500), mobile device A issues a fourth control signal comprising its mobile telephone number and the telephone number of the external party (e.g., using a Bluetooth channel) using its transmitter (104) to the at least one connected mobile device which responsively issues (step 825) a fifth control signal comprising a call placement request (e.g., using a Wi-Fi channel) to the broker service (500), further comprising the telephone number of the external party and the telephone number of mobile device A.

Note, if a plurality of mobile devices are connected to a broker service (500), mobile device A is operable to issue the fourth control signal to each of the plurality of mobile devices or a selected subset of the plurality of mobile devices. Each of the plurality of mobile devices or a selected subset of the plurality of mobile devices respectively, is operable to issue (step 825) the fifth control signal. In an embodiment, a decision is made as to which fifth control signal takes precedence e.g., in accordance with a set of rules (first mobile device to issue a fifth control signal; round robin etc.). Alternatively, the broker service (500) is operable to select an optimal path between the plurality of mobile devices and the disconnected mobile device A.

In response to receiving the fifth control signal, the broker service (500) responsively issues a sixth control signal in order to forward (step 830) the call to the external party e.g., by using the telephone number of the external party included in the fifth control signal, for example, by routing associated data packets over the Internet. In an embodiment, the broker service (500) is operable to specify the telephone number of mobile device A.

The external party may answer the call, otherwise, one or more actions are executed e.g., the broker service (500) issues a denial of service notification using a connected mobile device which subsequently passes the notification to the receiver (102) of mobile device A.

An embodiment provides a number of technical advantages. For example, the embodiment allows a call and/or other data to be transmitted/received to/from a mobile device which has no connection to a telephony service such as a service provider or to a system such as VOIP. Further, the embodiment allows for calls and/or other data to be transmitted/received to/from the mobile device which is the source/target of a call and/or other data providing an improvement over prior art systems which divert a call and/or other data to a separate device from the source/target. Advantageously, the embodiment uses a number of control signals (as described above) to initiate control of a number of system components (e.g., including system components which are externally located to the broker service e.g., a separate mobile device that is not connected to a telephony service and a separate mobile device that is connected to the broker service) so as to cause calls and/or other data to be transmitted/received to/from a source/target mobile device. Further, the embodiment is operable to change the configuration of communications in a telephony network so as to e.g., route a call to a mobile device that is not connected to a telephony service. In other words, the preferred embodiment has a technical effect on a process which is carried on outside a mobile device which is disconnected from a telephony service. Advantageously, the embodiment provides a number of policies to manage a group of mobile devices. The embodiment is scalable in that once a mobile device joins a group (wherein the process of joining has an associated low overhead), there is a minimal number of process steps that the mobile device needs to undertake in order to cause transmission/receipt of calls and/or other data if the mobile device is disconnected from a telephony service. Further, the embodiment is scalable in that a group of mobile devices can comprise any number of mobile devices subject to (factors such as available network capacity). Advantageously, the embodiment also makes use of e.g., load balancing mechanisms to provide an optimal route between a mobile device that is disconnected from a telephony service and one or more mobile devices that are connected to a broker service.

Figure 9:
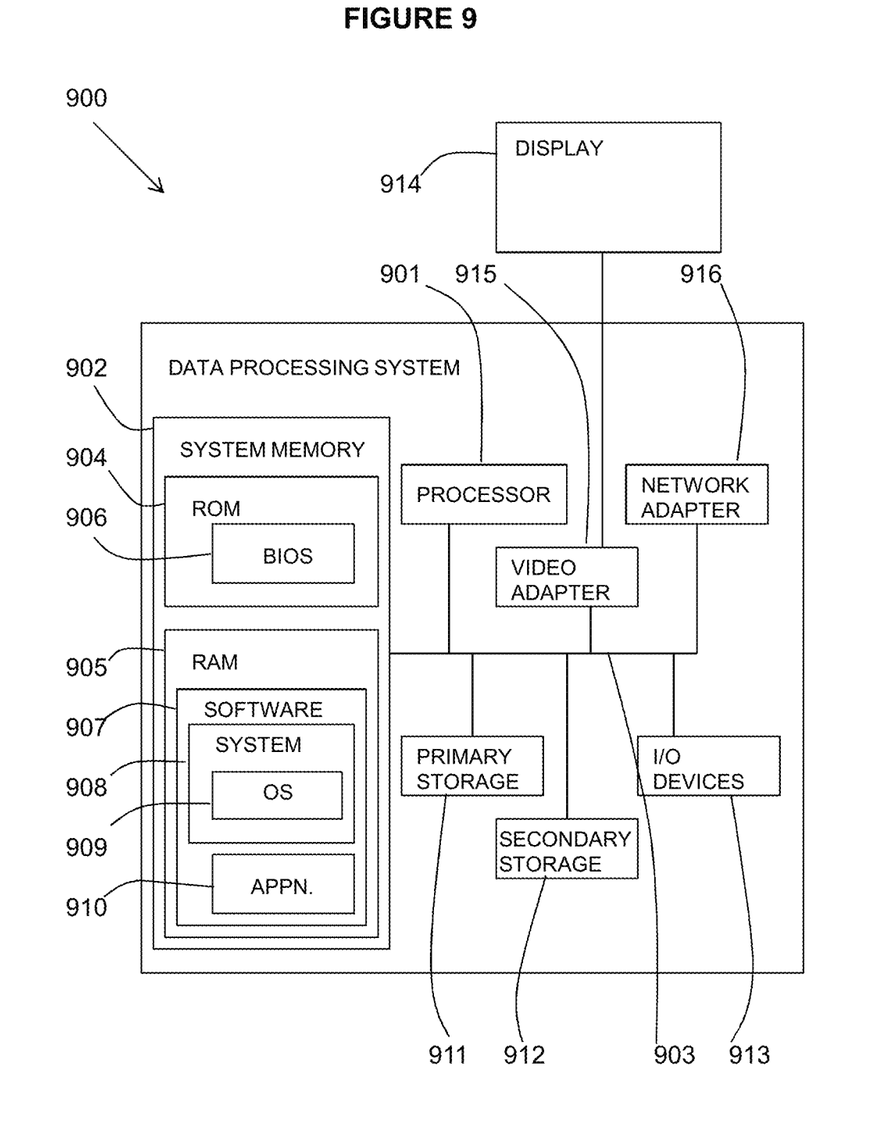
FIG. 9 is a block diagram of a system for implementing aspects of an embodiment of the present invention.

Referring to FIG. 9, an exemplary system for implementing aspects of the embodiment includes a data processing system 900 suitable for storing and/or executing program code including at least one processor 901 coupled directly or indirectly to memory elements through a bus system 903. The memory elements may include local memory employed during actual execution of the program code, bulk storage, and cache memories which provide temporary storage of at least some program code in order to reduce the number of times code must be retrieved from bulk storage during execution.

The memory elements may include system memory 902 in the form of read only memory (ROM) 904 and random access memory (RAM) 905. A basic input/output system (BIOS) 906 may be stored in ROM 904. System software 907 may be stored in RAM 905 including operating system software 908. Software applications 910 may also be stored in RAM 905.

The system 900 may also include a primary storage means 911 such as a magnetic hard disk drive and secondary storage means 912 such as a magnetic disc drive and an optical disc drive. The drives and their associated computer-readable media provide non-volatile storage of computer-executable instructions, data structures, program modules and other data for the system 900. Software applications may be stored on the primary and secondary storage means 911, 912 as well as the system memory 902.

The computing system 900 may operate in a networked environment using logical connections to one or more remote computers via a network adapter 916.

Input/output devices 913 may be coupled to the system either directly or through intervening I/O controllers. A user may enter commands and information into the system 900 through input devices such as a keyboard, pointing device, or other input devices (for example, microphone, joy stick, game pad, satellite dish, scanner, or the like). Output devices may include speakers, printers, etc. A display device 914 is also connected to system bus 903 via an interface, such as video adapter 915.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

The descriptions of the various Improvements and modifications can be made to the foregoing without departing from the scope of the present invention.

What is claimed is:

1. A method for controlling a second mobile device in response to a first mobile device having no connection to a telephony service, wherein the first mobile device is operable to transmit an identifier to the second mobile device using a network connection that is operable to connect mobile devices and wherein the first mobile device and the second mobile device are operable to join a first group, said method comprising:
   using, by e or more processors of a broker service apparatus, in response to receiving a first control signal comprising a first unique identifier and data from the telephony service, the first unique identifier to identify the first group, wherein the data is targeted to the first mobile device;
   determining, by the one or more processors in response to the first mobile device not being connected to the broker service apparatus that previously assigned the first unique identifier to the first group, whether the second mobile device is connected to the broker service apparatus; and
   issuing, by the one or more processors in response to the second mobile device being connected to the broker service apparatus, a second control signal to the second mobile device in order to forward the data to the second mobile device, said second control signal comprising an identifier of the first mobile device,
   wherein the second control signal causes the second mobile device to use the identifier of the first mobile device and the network connection in order to forward the data to the first mobile device.

2. The method of claim 1, wherein the first mobile device and the second mobile device are trusted.

3. The method of claim 1, wherein the first mobile device and the second mobile device are configured to use the first unique identifier as a call forwarding number.

4. The method of claim 1, said method further comprising:
   determining, by the one or more processors, that the data is targeted to the first mobile device by at least one of: inspecting a store detailing one or more mobile devices which are disconnected from the broker service; and inspecting a communication header.

5. The method of claim 1, said method further comprising:
   responsive to a plurality of mobile devices being connected to the broker service apparatus, selecting, by the one or more processors, an optimal path between the first and second mobile devices.

6. The method of claim 1, said method further comprising:
   responsive to the second mobile device being connected to the broker service apparatus, forwarding, by the one or more processors, a call placement request to the second mobile device using the network connection, wherein the second mobile device is responsively configured to forward the call placement request to the broker service apparatus.

7. A computer program product, comprising one or more computer readable hardware storage devices having computer readable program code stored therein, said program code containing instructions executable by one or more processors of a broker service apparatus to implement a method for controlling a second mobile device in response to a first mobile device having no connection to a telephony service, wherein the first mobile device is operable to transmit an identifier to the second mobile device using a network connection that is operable to connect mobile devices and wherein the first mobile device and the second mobile device are operable to join a first group, said broker service apparatus being a computer apparatus, said method comprising:
   using, by the one or more processors, in response to receiving a first control signal comprising a first unique identifier and data from the telephony service, the first unique identifier to identify the first group, wherein the data is targeted to the first mobile device;
   determining, by the one or more processors in response to the first mobile device not being connected to the broker service apparatus that previously assigned the first unique identifier to the first group, whether the second mobile device is connected to the broker service apparatus; and
   issuing, by the one or more processors in response to the second mobile device being connected to the broker service apparatus, a second control signal to the second mobile device in order to forward the data to the second mobile device, said second control signal comprising an identifier of the first mobile device,
   wherein the second control signal causes the second mobile device to use the identifier of the first mobile device and the network connection in order to forward the data to the first mobile device.

8. The computer program product of claim 7, wherein the first mobile device and the second mobile device are trusted.

9. The computer program product of claim 7, wherein the first mobile device and the second mobile device are configured to use the first unique identifier as a call forwarding number.

10. The computer program product of claim 7, said method further comprising:
   determining, by the one or more processors, that the data is targeted to the first mobile device by at least one of: inspecting a store detailing one or more mobile devices which are disconnected from the broker service; and inspecting a communication header.

11. The computer program product of claim 7, said method further comprising:
   responsive to a plurality of mobile devices being connected to the broker service apparatus, selecting, by the one or more processors, an optimal path between the first and second mobile devices.

12. The computer program product of claim 7, said method further comprising:
   responsive to the second mobile device being connected to the broker service apparatus, forwarding, by the one or more processors, a call placement request to the second mobile device using the network connection, wherein the second mobile device is responsively configured to forward the call placement request to the broker service apparatus.

13. A broker service apparatus, comprising one or more processors, one or more memories, and one or more computer readable hardware storage devices, said one or more hardware storage device containing program code executable by the one or more processors via the one or more memories to implement a method for controlling a second mobile device in response to a first mobile device having no connection to a telephony service, wherein the first mobile device is operable to transmit an identifier to the second mobile device using a network connection that is operable to connect mobile devices and wherein the first mobile device and the second mobile device are operable to join a first group, said broker service apparatus being a computer apparatus, said method comprising:
   using, by the one or more processors, in response to receiving a first control signal comprising a first unique identifier and data from the telephony service, the first unique identifier to identify the first group, wherein the data is targeted to the first mobile device;
   determining, by the one or more processors in response to the first mobile device not being connected to the broker service apparatus that previously assigned the first unique identifier to the first group, whether the second mobile device is connected to the broker service apparatus; and
   issuing, by the one or more processors in response to the second mobile device being connected to the broker service apparatus, a second control signal to the second mobile device in order to forward the data to the second mobile device, said second control signal comprising an identifier of the first mobile device,
   wherein the second control signal causes the second mobile device to use the identifier of the first mobile device and the network connection in order to forward the data to the first mobile device.

14. The broker service apparatus of claim 13, wherein the first mobile device and the second mobile device are trusted.

15. The broker service apparatus of claim 13, wherein the first mobile device and the second mobile device are configured to use the first unique identifier as a call forwarding number.

16. The broker service apparatus of claim 13, said method further comprising:
   determining, by the one or more processors, that the data is targeted to the first mobile device by at least one of: inspecting a store detailing one or more mobile devices which are disconnected from the broker service; and inspecting a communication header.

17. The broker service apparatus of claim 13, said method further comprising:
   responsive a plurality of mobile devices being connected to the broker service apparatus, selecting, by the one or more processors, an optimal path between the first and second mobile devices.

18. The broker service apparatus of claim 13, said method further comprising:
   responsive to the second mobile device being connected to the broker service apparatus, forwarding, by the one or more processors, a call placement request to the second mobile device using the network connection, wherein the second mobile device is responsively configured to forward the cell placement request to the broker service apparatus.

* * * * *